(12) United States Patent
Adams

(10) Patent No.: US 7,938,104 B2
(45) Date of Patent: May 10, 2011

(54) FUEL EVAPORATOR SYSTEM FOR VAPORIZING LIQUID FUELS TO BE USED WITHIN COMBUSTION-POWERED DEVICES

(75) Inventor: Joseph S. Adams, Salt Spring Island (CA)

(73) Assignee: Illinois Tool Works Inc., Glenview, IL (US)

( * ) Notice: Subject to any disclaimer, the term of this patent is extended or adjusted under 35 U.S.C. 154(b) by 900 days.

(21) Appl. No.: 11/889,042

(22) Filed: Aug. 8, 2007

(65) Prior Publication Data

US 2008/0110418 A1    May 15, 2008

Related U.S. Application Data

(60) Provisional application No. 60/858,637, filed on Nov. 13, 2006.

(51) Int. Cl.
F02M 31/00       (2006.01)
(52) U.S. Cl. ........................................ 123/557
(58) Field of Classification Search .......... 123/543–557; 261/152
See application file for complete search history.

(56) References Cited

U.S. PATENT DOCUMENTS

| | | | |
|---|---|---|---|
| 1,530,882 A * | 3/1925 | Chapin | 123/522 |
| 1,973,889 A * | 9/1934 | Timian | 123/545 |
| 3,246,841 A * | 4/1966 | Hans Kling | 237/12.3 B |
| 4,086,893 A * | 5/1978 | Bernecker | 123/549 |
| 4,157,700 A * | 6/1979 | Conner | 123/557 |
| 4,318,689 A | 3/1982 | Forster | |
| 4,342,303 A * | 8/1982 | McCord | 123/557 |
| 4,570,605 A * | 2/1986 | Eberhardt | 123/576 |
| 4,821,683 A | 4/1989 | Veldman | |
| 4,905,634 A | 3/1990 | Veldman | |
| 5,291,870 A * | 3/1994 | Covey, Jr. | 123/545 |
| 5,870,525 A | 2/1999 | Young | |
| 6,189,516 B1 * | 2/2001 | Hei Ma | 123/524 |
| 6,912,988 B2 | 7/2005 | Adams | |
| 2002/0105101 A1 * | 8/2002 | Menzel et al. | 261/152 |
| 2003/0127076 A1 * | 7/2003 | Wijaya | 123/557 |
| 2005/0005918 A1 * | 1/2005 | Newhouse et al. | 123/549 |

FOREIGN PATENT DOCUMENTS

| | | |
|---|---|---|
| DE | 522323 | 7/1931 |
| DE | 2422628 | 11/1975 |
| GB | 01290 | 0/1913 |
| GB | 10726 | 0/1914 |

* cited by examiner

Primary Examiner — M. McMahon
(74) Attorney, Agent, or Firm — Law Offices of Steven W. Weinrieb

(57) ABSTRACT

A liquid fuel supply and evaporator system for use in connection with combustion-powered fastener-driving tools comprises an evaporator housing which is disposed in thermal communication with the combustion chamber housing of the tool in order to absorb heat or thermal radiation generated within the tool combustion chamber. A sintered metal liquid fuel evaporator element is interposed between the evaporator housing and a liquid fuel distribution manifold whereby the liquid fuel is effectively converted into a gaseous fuel which is then transmitted by a gas distribution manifold toward the combustion chamber of the fastener-driving tool.

20 Claims, 3 Drawing Sheets

FUEL EVAPORATOR SYSTEM FOR VAPORIZING LIQUID FUELS TO BE USED WITHIN COMBUSTION-POWERED DEVICES

CROSS REFERENCE TO RELATED PATENT APPLICATION

This patent application is related to, based upon, and effectively a utility patent application conversion from U.S. Provisional Patent Application Ser. No. 60/858,637, which was filed on Nov. 13, 2006, the filing date benefits of which are hereby respectfully claimed.

FIELD OF THE INVENTION

The present invention relates generally to combustion-powered systems, and more particularly to new and improved liquid fuel supply and evaporator system for use in connection with combustion-powered devices, such as, for example, combustion-powered tools, more specifically, combustion-powered fastener-driving tools, wherein the new and improved evaporator system can be utilized to effectively convert a liquid fuel into a gaseous fuel for combustion within the combustion chamber of a combustion-powered fastener-driving tool such that liquid fuel sources, as well as gaseous fuel sources, can be utilized to power combustion-powered fastener-driving tools.

BACKGROUND OF THE INVENTION

Portable combustion-powered tools, having various different means for conducting or charging a combustible fuel into a suitable combustion chamber, are of course well-known. Examples of such portable power tools are disclosed within U.S. Pat. No. 6,912,988 which issued to Adams on Jul. 5, 2005, U.S. Pat. No. 4,905,634 which issued to Veldman on Mar. 6, 1990 and U.S. Pat. No. 4,821,683 which issued to Veldman on Apr. 18, 1989. In accordance with the disclosures of such patents, the portable combustion-powered tools can utilize any one of various gaseous fuels, such as, for example, compressed natural gas, liquid petroleum gas, butane, or the like. In addition, the introduction of the incoming gaseous fuel is also utilized to effectively induce or entrain the flow of ambient air into the combustion chamber of the power tool either for scavenging purposes in connection with residual gases that will be present within the combustion chamber upon completion of a particular power tool firing cycle, or for charging purposes in connection with the preparation for and initiation of a subsequent power tool firing cycle. While the portable combustion-powered tools, as disclosed within the aforenoted patents, are generally satisfactory, it is noted that such portable power tools nevertheless exhibit some operational drawbacks or limitations, particularly when it is desired to utilize liquid fuels as the fuel source. For example, while it is often desirable to operate such portable combustion-powered tools with liquid fuels as the fuel sources it is important that the liquid fuels firstly be converted into gaseous fuels so as to enable the fuels to undergo properly controlled combustion. In connection with the conversion of the liquid fuels into gaseous fuels, it is also important that a predetermined amount of the liquid fuel be supplied so as to achieve proper or more accurate stoichiometric air-fuel ratios.

A need therefore exists in the art for a new and improved liquid fuel supply and evaporator system for use in connection with portable combustion-powered tools, such as, for example, portable combustion-powered fastener-driving tools, wherein the fuel supply and combustion chamber system can utilize liquid fuels, wherein the liquid fuel can be rapidly and efficiently converted into a gaseous fuel by means of a new and improved fuel evaporator system, and wherein the liquid fuel supply and evaporator system can utilize a portioning valve structure for providing a predetermined amount of the liquid fuel to be discharged into the fuel evaporator system for conversion into a gaseous fuel for use within the combustion chamber of the portable combustion-powered fastener-driving tool.

SUMMARY OF THE INVENTION

The foregoing and other objectives are achieved in accordance with the teachings and principles of the present invention through the provision of a new and improved liquid fuel supply and evaporator system for use in connection with combustion-powered devices, such as, for example, combustion-powered tools, more specifically, combustion-powered fastener-driving tools. The new and improved fuel evaporator system comprises an evaporator housing which is adapted to be disposed in thermal communication with, for example, the combustion chamber housing of the portable combustion-powered fastener-driving tool in order to absorb the heat or thermal radiation generated within, and emitted by, the combustion chamber housing as a result of the combustion process which cyclically occurs within the combustion chamber.

A sintered metal liquid fuel evaporator element is disposed internally within the evaporator housing so as to be heated thereby, and a liquid fuel distribution manifold is disposed internally within the sintered metal liquid fuel evaporator element so as to charge liquid fuel, supplied to the liquid fuel distribution manifold from a liquid fuel source, into the sintered metal liquid fuel evaporator element. A liquid fuel portioning valve is interposed between the liquid fuel source and the liquid fuel distribution manifold so as to discharge a predetermined amount of the liquid fuel into the liquid fuel distribution manifold. As a result of the heating of the sintered metal liquid fuel evaporator element by means of the heated evaporator housing, the liquid fuel, charged into and dispersed within the sintered metal liquid fuel evaporator element, is effectively converted from a liquid fuel into a gaseous fuel which is then transmitted by means of a gas distribution manifold, incorporated within the evaporator housing, toward the combustion chamber of the portable combustion powered fastener-driving tool.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
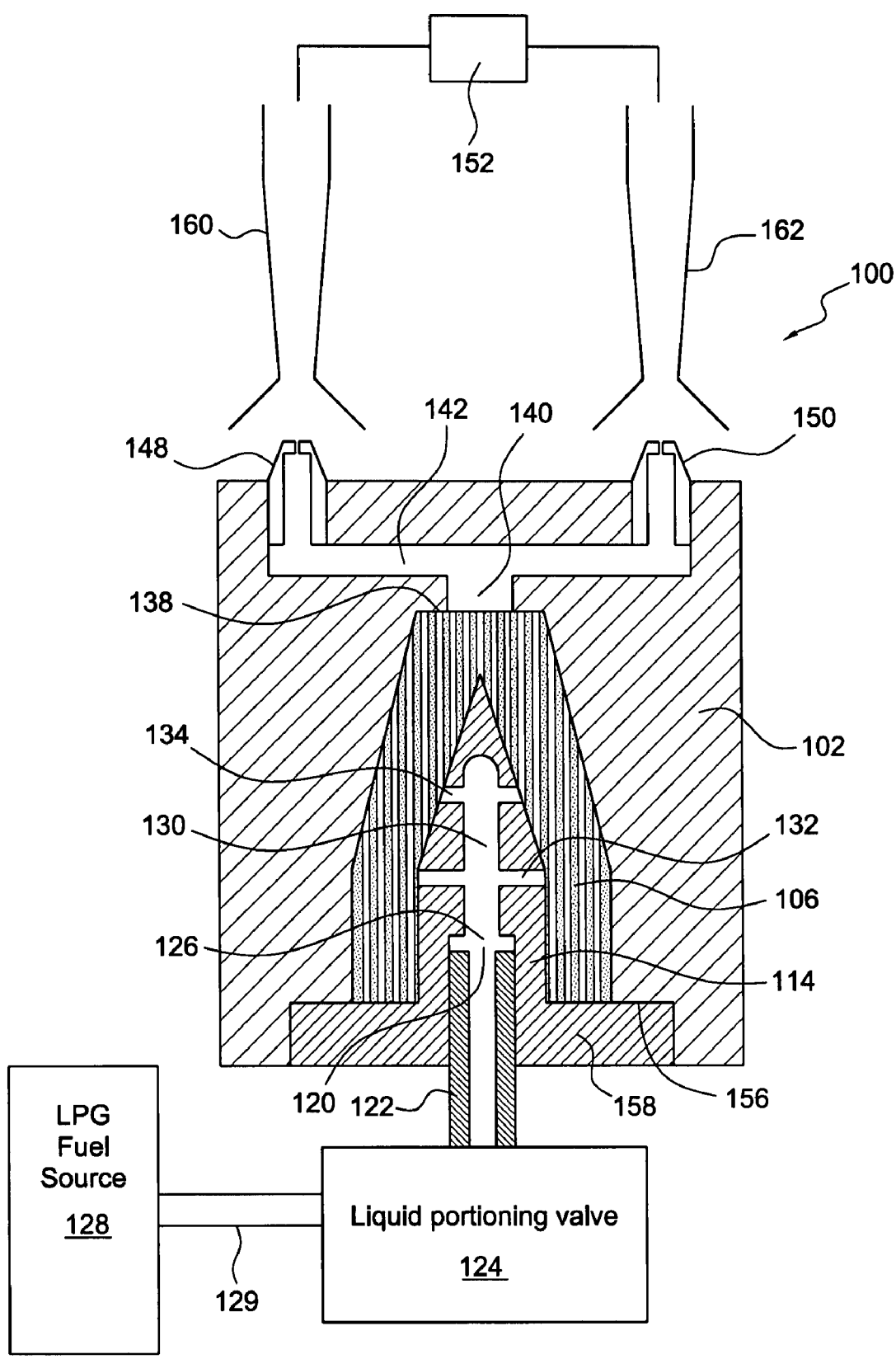
FIG. 1 is a schematic, cross-sectional view of a new and improved liquid fuel supply and evaporator system which has been constructed in accordance with the principles and teachings of the present invention, and which shows the cooperative parts thereof, for vaporizing liquid fuels to be used within portable combustion-powered devices, such as, for example, portable combustion-powered fastener-driving tools, and wherein the various component parts thereof are disclosed prior to the initiation of a fuel-injection operative cycle.
Figure 2:
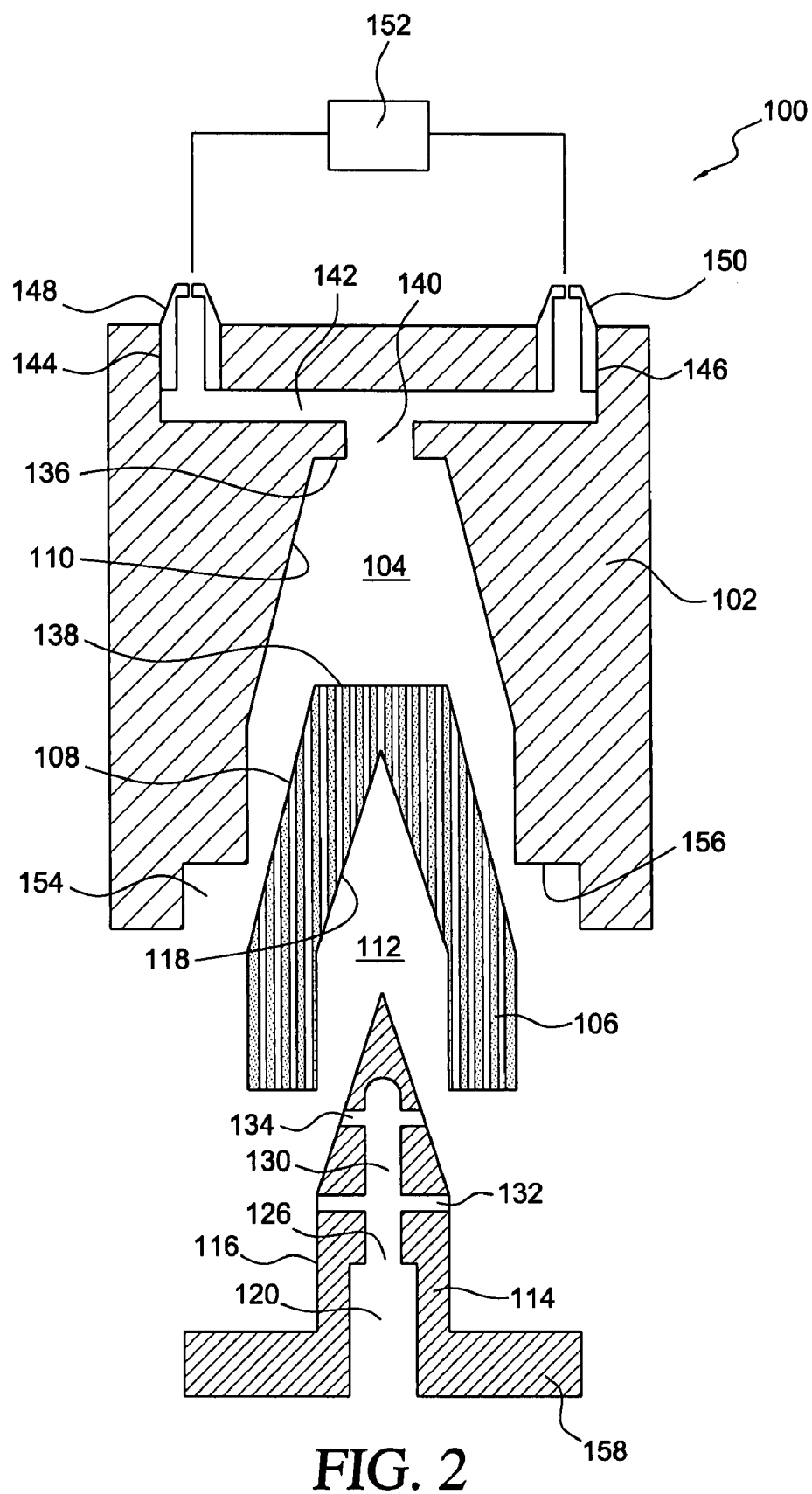
FIG. 2 is a partial schematic, exploded, cross-sectional view of the new and improved liquid fuel supply and evaporator system, as disclosed within FIG. 1, wherein some of the detailed structure of the various components comprising the new and improved liquid fuel supply and evaporator system can be better appreciated due to the exploded nature of the drawing.

Referring now to the drawings, and more particularly to FIGS. 1 and 2 thereof, a new and improved liquid fuel supply and evaporator system, which has been constructed in accordance with the principles and teachings of the present invention for effectively vaporizing liquid fuels such that liquid fuel sources can be used within portable combustion-powered devices, such as, for example, portable combustion-powered fastener-driving tools, and which discloses the various structural components thereof prior to the initiation of a fuel-injection operative cycle, is disclosed and is generally indicated by the reference character 100. More particularly, it is seen that the new and improved liquid fuel supply and evaporator system 100 comprises an evaporator housing 102 which is fabricated from a suitable metal or other heat conducting material so as to be capable of absorbing heat in order to, in turn, provide the necessary heat for vaporizing a liquid fuel as will be more fully appreciated hereinafter. In view of the fact that the liquid fuel supply and evaporator system 100 is adapted to be used within combustion-powered devices, such as, for example, combustion-powered fastener-driving tools, the evaporator housing 102 is adapted to be disposed in thermal communication with, for example, the combustion chamber housing of the portable combustion-powered fastener-driving tool so as to in fact absorb the heat or thermal energy generated within, and emitted by, the combustion chamber housing of the combustion-powered fastener-driving tool as a result of the combustion process which cyclically occurs within the combustion chamber. As can best be appreciated from FIG. 2, it is seen that the axially central portion of the evaporator housing 102 is provided with a substantially frusto-conically-shaped axially extending bore 104, and that a substantially correspondingly frusto-conically configured sintered metal liquid fuel evaporator element 106 is adapted to be disposed within the bore 104 such that the external peripheral wall surface portion 108 of the sintered metal liquid fuel evaporator element 106 is disposed in surface-to-surface contact with the internal peripheral wall surface portion 110 of the evaporator housing 102 which defines bore 104. In addition, it is also seen that the axially central portion of the sintered metal liquid fuel evaporator element 106 is likewise provided with a substantially conically-shaped axially extending bore 112, and that a substantially correspondingly configured liquid fuel distribution manifold 114, which is also preferably fabricated from a suitable metal, is adapted to be disposed within the bore 112 such that the external peripheral wall surface portion 116 of the liquid fuel distribution manifold 114 is disposed in surface-to-surface contact with the internal peripheral wall surface portion 118 of the sintered metal liquid fuel evaporator element 106 which defines bore 112.

Still further, it is seen that the upstream or rear end portion of the liquid fuel distribution manifold 114 is counterbored, as at 120, so as to receive a liquid fuel inlet fitting and actuator 122 which is operatively attached to a liquid fuel portioning valve 124 as can best be seen in FIG. 1, whereby the counterbored region 120 of the liquid fuel distribution manifold 114 also effectively defines or serves as a liquid fuel inlet port 126. The liquid fuel portioning valve 124 is, in turn, operatively connected to, for example, a liquid petroleum gas fuel source 128 by means of a fluid conduit 129, and in this manner, when the liquid fuel inlet fitting and actuator 122 is in fact actuated, a predetermined amount of the liquid fuel, as supplied from the liquid petroleum gas fuel source 128, is dispensed or injected from the liquid fuel inlet fitting and actuator 122 into the liquid fuel inlet port 126 of the counterbored liquid fuel distribution manifold 114.

Still yet further, it is seen that the liquid fuel distribution manifold 114 has an axial passageway or bore 130 defined therein which is coaxially disposed with respect to the liquid fuel inlet fitting and actuator 122 and which extends axially from the axial central portion of the liquid fuel distribution manifold 114 toward the pointed forward or downstream end portion of the liquid fuel distribution manifold 114, and a pair of axially spaced transversely oriented passageways or bores 132,134 which are fluidically connected to the axially oriented passageway or bore 130. In this manner, when the liquid fuel inlet fitting and actuator 122 is in fact actuated, a predetermined amount of the liquid fuel, as supplied from the liquid petroleum gas fuel source 128, is dispensed from the liquid fuel inlet fitting and actuator 122 into the liquid fuel inlet port 126 of the counterbored liquid fuel distribution manifold 114, the liquid fuel will be further conducted into the axially oriented passageway or bore 130, and will, in turn, be conducted, through means of the transversely oriented passageways or bores 132,134, into the sintered metal liquid fuel evaporator element 106. Due to the inherently porous nature characteristic of the sintered metal liquid fuel evaporator element 106, the liquid fuel, effectively injected or charged into the sintered metal liquid fuel evaporator element 106, will be dispersed within and throughout the sintered metal liquid fuel evaporator element 106 in preparation for being converted from its liquid state into a gaseous state as a result of being evaporated when heat or thermal radiation is transmitted or conducted from the evaporator housing 102 to the sintered metal liquid fuel evaporator element 106.

With reference continuing to be made to FIGS. 1 and 2, it is seen that the forward or downstream end portion of the evaporator housing 102, which defines the substantially frusto-conically-shaped axially extending bore 104, is also counterbored so as to effectively form or define an annular shoulder portion 136, and correspondingly, the downstream or forward end portion of the frusto-conically configured sintered metal liquid fuel evaporator element 106 has a planar surface portion 138 which is adapted to be seated upon the annular shoulder portion 136 of the evaporator housing 102 when the sintered metal liquid fuel evaporator element 106 is installed within the evaporator housing 102 as illustrated within FIG. 1. The annular shoulder portion 136 of the evaporator housing 102 annularly surrounds an axially located gaseous fuel discharge port 140, and it can therefore be appreciated that, as a result of the frusto-conically configured sintered metal liquid fuel evaporator element 106, once the liquid fuel, dispersed within and throughout the sintered metal liquid fuel evaporator element 106, has effectively been converted from its liquid state to its gaseous state, the flow of the gaseous fuel will in effect be naturally fluidically conducted toward the gaseous fuel discharge port 140. In addition, it is also seen that the gaseous fuel discharge port 140 is fluidically connected to a central portion of a transversely oriented passageway 142 which is formed within the forward or downstream end portion of the evaporator housing 102 and which effectively defines or forms a gaseous fuel distribution manifold. Opposite end portions of the gaseous fuel distribution manifold 142 are respectively provided with an exhaust port 144,146, and a pair of gaseous fuel discharge nozzles 148,150 are fixedly mounted within the exhaust ports 144,146 so as to discharge the gaseous fuel toward the combustion chamber 152 of, for example, a combustion-powered fastener-driving tool. Lastly, it is also seen that the rear or upstream end portion of the evaporator housing 102 is also provided with a counterbored region 154 so as to effectively define an annular shoulder portion 156 upon the evaporator housing 102. It is also seen that the upstream or rear end portion of the liquid fuel distribution manifold 114 is provided with an annular flanged portion 158. Accordingly, when the liquid fuel distribution manifold 114 is in fact mounted within the sintered metal liquid fuel evaporator element 106 and the evaporator housing 102, as illustrated within FIG. 1, the flanged portion 158 of the liquid fuel distribution manifold 114 will be seated within the counterbored region 154 of the evaporator housing 102 and will be engaged with the annular shoulder portion 156 of the evaporator housing 102.

Figure 3:
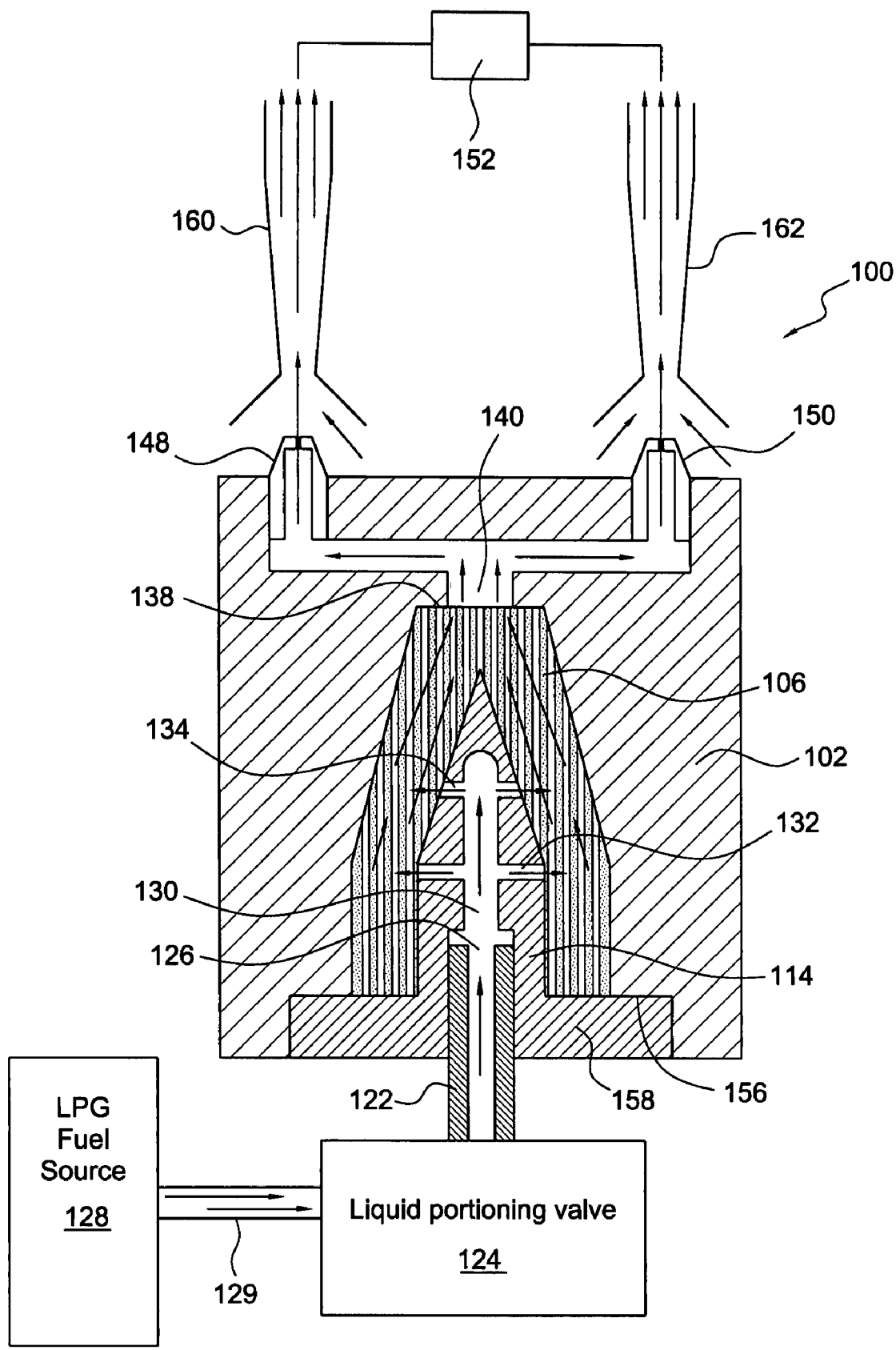
FIG. 3 is a schematic, cross-sectional view of the new and improved liquid fuel supply and evaporator system, as disclosed in FIG. 1, wherein, however, a fuel-injection operative cycle has been initiated.

Having described substantially all of the structural components comprising the new and improved liquid fuel supply and evaporator system 100, a brief description of an operative cycle of the new and improved liquid fuel supply and evaporator system 100 will now be described with reference being made to FIG. 3. More particularly, when the liquid fuel portioning valve 124 is pushed or moved upwardly from its normal, non-actuated position, as illustrated within FIG. 1, to its actuated position as illustrated within FIG. 3, a predetermined amount of liquid fuel, as supplied from the liquid fuel source 128 and through the liquid fuel conduit 129, is dispensed or injected by means of the liquid fuel portioning valve 124 through the liquid fuel inlet port 126 and into the axially oriented passageway or bore 130 defined within the liquid fuel distribution manifold 114. The liquid fuel will, in turn, flow through the axially oriented passageway or bore 130, as well as into and through the transversely oriented passageways or bores 132,134 whereby the liquid fuel will be dispersed into oppositely disposed side portions of the sintered metal liquid fuel evaporator element 106.

As was noted hereinbefore, since the evaporator housing 102 is disposed in thermal communication with a heat source of the combustion-powered tool, such as, for example, the combustion chamber housing of the combustion-powered tool, and since the evaporator housing 102 is fabricated from a suitable heat conductive material, such as, for example, a suitable metal, the evaporator housing 102 will be heated by means of the heat or thermal radiation generated within the tool combustion chamber 152 and emitted by the tool combustion chamber housing. In addition, it is of course noted that the liquid fuel distribution manifold 114 is likewise disposed in thermal communication with the evaporator housing 102 as a result of the flanged portion 158 of the liquid fuel distribution manifold 114 being disposed within the counterbored region 154 of the evaporator housing 102 wherein the flanged portion 158 of the liquid fuel distribution manifold 114 is disposed in contact with the shoulder portion 156 of the evaporator housing 102. Accordingly, the liquid fuel distribution manifold 114 will be indirectly heated by means of the heat or thermal radiation generated within the tool combustion chamber 152 and emitted by the tool combustion chamber housing, that is, through means of the evaporator housing 102, and accordingly still further, it can be appreciated that both the internal and external regions of the sintered metal liquid fuel evaporator element 106 will be respectively heated by means of the liquid fuel distribution manifold 114 and the evaporator housing 102. Furthermore, due to the inherent structural characteristics of the sintered metal liquid fuel evaporator element 106, all regions of the sintered metal liquid fuel evaporator element 106 therefore become heated whereby as the liquid fuel is dispersed throughout the sintered metal liquid fuel evaporator element 106, the liquid fuel will be vaporized and effectively converted into a gaseous fuel.

Continuing still further, the gaseous fuel will be discharged from the sintered metal liquid fuel evaporator element 106 through means of the front or downstream planar surface portion 138 and the gaseous fuel discharge port 140 so as to flow into the gaseous fuel distribution manifold 142. From the gaseous fuel distribution manifold 142, the gaseous fuel can then flow through the pair of gaseous fuel discharge nozzles 148,150 and into the combustion chamber 152. While the gaseous fuel can be conducted from the pair of gaseous fuel discharge nozzles 148,150 directly into the combustion chamber 152 as illustrated, for example, within FIG. 2, the gaseous fuel can alternatively be conducted from the pair of gaseous fuel discharge nozzles 148,150 through a pair of jet pump venturi structures 160,162 wherein ambient air is effectively entrained into the jet pump venturi structures 160,162, as the gaseous fuel flows through the jet pump venturi structures, so as to form air/fuel mixtures to be conducted into the combustion chamber 152, all as illustrated within FIG. 3. It is to be noted that if the jet pump venturi structures 160,162 are optionally omitted, as illustrated within FIG. 2, ambient air can of course be introduced into the gaseous fuel flows being conducted outwardly from the pair of gaseous fuel discharge nozzles 148,150 and into the combustion chamber 152 so as to nevertheless effectively form the air/fuel mixtures to be introduced into the combustion chamber 152.

Thus, it may be seen that in accordance with the teachings and principles of the present invention, there has been provided a new and improved liquid fuel supply and evaporator system for use in connection with combustion-powered devices, such as, for example, combustion-powered tools, more specifically, combustion-powered fastener-driving tools wherein the new and improved fuel evaporator system comprises an evaporator housing which is adapted to be disposed in thermal communication with, for example, the combustion chamber housing of the portable combustion-powered fastener-driving tool in order to absorb the heat or thermal radiation generated within, and emitted by, the combustion chamber housing as a result of the combustion process which cyclically occurs within the combustion chamber. A sintered metal liquid fuel evaporator element is disposed internally within the evaporator housing so as to be heated thereby, and a liquid fuel distribution manifold is disposed internally within the sintered metal liquid fuel evaporator element so as to charge liquid fuel, supplied to the liquid fuel distribution manifold from a liquid fuel source, into the sintered metal liquid fuel evaporator element. A liquid fuel portioning valve is interposed between the liquid fuel source and the liquid fuel distribution manifold so as to discharge a predetermined amount of the liquid fuel into the liquid fuel distribution manifold. As a result of the heating of the sintered metal liquid fuel evaporator element by means of the heated evaporator housing, the liquid fuel, charged into and dispersed within the sintered metal liquid fuel evaporator element, is effectively converted from a liquid fuel into a gaseous fuel which is then transmitted by means of a gas distribution manifold, incorporated within the evaporator housing, toward the combustion chamber of the portable combustion powered fastener-driving tool. The portable combustion-powered fastener-driving tool is therefore capable of being operated with liquid fuels as opposed to being required to be operated only with gaseous fuels.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A liquid fuel supply and evaporator system for converting a liquid fuel into a gaseous fuel and for supplying the gaseous fuel to a combustion chamber, comprising:
   a housing;
   a liquid fuel supply source;
   an evaporator element, for converting a liquid fuel into a gaseous fuel by an evaporation process for use within said combustion chamber, disposed internally within said housing such that an external surface portion of said evaporator element is disposed in thermal communication with said housing;
   a liquid fuel distribution manifold interposed between said liquid fuel supply source and said evaporator element for conducting a liquid fuel from said liquid fuel supply source into said evaporator element, said liquid fuel distribution manifold being disposed in thermal communication with said housing and being disposed internally within said evaporator element such that an internal surface portion of said evaporator element is disposed in thermal communication with said liquid fuel distribution manifold; and
   a source of heat for heating said housing;
   whereby as a result of said heated housing being disposed in thermal communication with said evaporator element as well as being disposed in thermal communication with said liquid fuel distribution manifold, said heated evaporator element, being heated by both said housing and said liquid fuel distribution manifold, can convert the liquid fuel into a gaseous fuel by means of the evaporation process and conduct the gaseous fuel outwardly from said evaporator element and toward said combustion chamber.

2. The liquid fuel supply and evaporator system as set forth in claim 1, wherein:
   said evaporator element is fabricated from sintered metal.

3. The liquid fuel supply and evaporator system as set forth in claim 1, further comprising:
   a liquid portioning valve interposed between said liquid fuel supply source and said liquid fuel distribution manifold for dispensing a predetermined amount of liquid fuel from said liquid fuel supply source into said liquid fuel distribution manifold.

4. The liquid fuel supply and evaporator system as set forth in claim 3, wherein:
   said liquid fuel distribution manifold has a plurality of fluid passageways defined therein for distributing the liquid fuel, dispensed thereinto by said liquid portioning valve, toward different regions of said evaporator element.

5. The liquid fuel supply and evaporator system as set forth in claim 1, wherein:
   said liquid fuel distribution manifold is fabricated from metal.

6. The liquid fuel supply and evaporator system as set forth in claim 5, wherein:
   said heated liquid fuel distribution manifold is disposed internally within said evaporator element such that external wall portions of said heated liquid fuel distribution manifold are disposed in contact with internal wall portions of said evaporator element; and
   said evaporator element is disposed internally within said heated housing such that external wall portions of said evaporator element are disposed in contact with internal wall portions of said heated housing.

7. The liquid fuel supply and evaporator system as set forth in claim 6, wherein:
   a gaseous fuel discharge port is defined within said heated housing; and
   said evaporator element has a substantially conical configuration such that a downstream end portion of said evaporator element is disposed in fluidic communication with said gaseous fuel discharge port so as to fluidically conduct the gaseous fuel into said gaseous fuel discharge port.

8. The liquid fuel supply and evaporator system as set forth in claim 7, further comprising:
   a plurality of gaseous fuel discharge nozzles disposed upon said heated housing for discharging gaseous fuel toward combustion apparatus within which the gaseous fuel is to be combusted; and
   a gaseous fuel distribution manifold defined within said heated housing and fluidically connecting said gaseous fuel discharge port and said plurality of gaseous fuel discharge nozzles so as to distribute the gaseous fuel from said gaseous fuel discharge port to said plurality of gaseous fuel discharge nozzles.

9. In combination, a liquid fuel supply and evaporator system, and combustion apparatus, comprising:
   combustion apparatus within which a gaseous fuel is to be combusted;
   a housing;
   a liquid fuel supply source;
   an evaporator element, for converting a liquid fuel into a gaseous fuel by an evaporation process for use within said combustion apparatus, disposed internally within said housing such that an external surface portion of said evaporator element is disposed in thermal communication with said housing;
   a liquid fuel distribution manifold interposed between said liquid fuel supply source and said evaporator element for conducting a liquid fuel from said liquid fuel supply source into said evaporator element, said liquid fuel distribution manifold being disposed in thermal communication with said housing and being disposed internally within said evaporator element such that an internal surface portion of said evaporator element is disposed in thermal communication with said liquid fuel distribution manifold;
   a source of heat for heating said housing;
   whereby as a result of said heated housing being disposed in thermal communication with said evaporator element as well as being disposed in thermal communication with said liquid fuel distribution manifold, said heated evaporator element, being heated by both said housing and said liquid fuel distribution manifold, can convert the liquid fuel into a gaseous fuel by means of said evaporation process and conduct the gaseous fuel outwardly from said evaporator element and toward said combustion apparatus; and
   structure for conducting the gaseous fuel from said evaporator element into said combustion apparatus.

10. The combination as set forth in claim 9, wherein:
    said heated housing is disposed in thermal communication with said combustion apparatus so as to be heated by said combustion apparatus.

11. The combination as set forth in claim 9, wherein:
    said evaporator element is fabricated from sintered metal.

12. The combination as set forth in claim 9, further comprising:
a liquid portioning valve interposed between said liquid fuel supply source and said liquid fuel distribution manifold for dispensing a predetermined amount of liquid fuel from said liquid fuel supply source into said liquid fuel distribution manifold.

13. The combination as set forth in claim 9, wherein:
said liquid fuel distribution manifold has a plurality of fluid passageways defined therein for distributing the liquid fuel, dispensed thereinto by said liquid portioning valve, toward different regions of said evaporator element.

14. The combination as set forth in claim 9, wherein:
said liquid fuel distribution manifold is fabricated from metal.

15. The combination as set forth in claim 14, wherein:
said heated liquid fuel distribution manifold is disposed internally within said evaporator element such that external wall portions of said heated liquid fuel distribution manifold are disposed in contact with internal wall portions of said evaporator element; and
said evaporator element is disposed internally within said heated housing such that external wall portions of said evaporator element are disposed in contact with internal wall portions of said heated housing.

16. The combination as set forth in claim 15, wherein:
a gaseous fuel discharge port is defined within said heated housing; and
said evaporator element has a substantially conical configuration such that a downstream end portion of said evaporator element is disposed in fluidic communication with said gaseous fuel discharge port so as to fluidically conduct the gaseous fuel into said gaseous fuel discharge port.

17. The combination as set forth in claim 16, further comprising:
a plurality of gaseous fuel discharge nozzles disposed upon said heated housing for discharging gaseous fuel toward combustion apparatus within which the gaseous fuel is to be combusted; and
a gaseous fuel distribution manifold defined within said heated housing and fluidically connecting said gaseous fuel discharge port and said plurality of gaseous fuel discharge nozzles so as to distribute the gaseous fuel from said gaseous fuel discharge port to said plurality of gaseous fuel discharge nozzles.

18. The combination as set forth in claim 17, further comprising:
jet pump structure interposed between said plurality of gaseous fuel discharge nozzles and said combustion apparatus for conducting the gaseous fuel into said combustion apparatus and for entraining ambient air into the gaseous fuel so as to form an air/fuel mixture for combustion within said combustion apparatus.

19. The combination as set forth in claim 17, wherein:
said combustion apparatus comprises a combustion-powered fastener-driving tool.

20. A method of converting a liquid fuel into a gaseous fuel and for supplying the gaseous fuel to a combustion chamber, comprising the steps of:
providing a housing;
providing a liquid fuel from a liquid fuel supply source;
providing an evaporator element, for converting the liquid fuel into a gaseous fuel by an evaporation process for use within said combustion chamber, internally within said housing such that an external surface portion of said evaporator element is disposed in thermal communication with said housing;
interposing a liquid fuel distribution manifold between said liquid fuel supply source and said evaporator element so as to conduct the liquid fuel from said liquid fuel supply source into said evaporator element, said liquid fuel distribution manifold being disposed in thermal communication with said housing and being disposed internally within said evaporator element such that an internal surface portion of said evaporator element is disposed in thermal communication with said liquid fuel distribution manifold;
heating said housing; and
whereby as a result of said heated housing being disposed in thermal communication with said evaporator element as well as being disposed in thermal communication with said liquid fuel distribution manifold, said heated evaporator element, being heated by both said housing and said liquid fuel distribution manifold, can convert the liquid fuel into a gaseous fuel by means of the evaporation process and conduct the gaseous fuel outwardly from said evaporator element and toward said combustion chamber.

* * * * *